United States Patent
Liang et al.

(10) Patent No.: US 12,517,800 B2
(45) Date of Patent: Jan. 6, 2026

(54) IPMI COMMAND PROCESSING METHOD AND SYSTEM FOR BMC, AND DEVICE AND MEDIUM

(71) Applicant: INSPUR SUZHOU INTELLIGENT TECHNOLOGY CO., LTD., Jiangsu (CN)

(72) Inventors: Shengnan Liang, Jiangsu (CN); Fengbing Cao, Jiangsu (CN); Shuai Huang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 367 days.

(21) Appl. No.: 18/012,926

(22) PCT Filed: Jun. 29, 2021

(86) PCT No.: PCT/CN2021/103285
§ 371 (c)(1),
(2) Date: Dec. 25, 2022

(87) PCT Pub. No.: WO2022/037267
PCT Pub. Date: Feb. 24, 2022

(65) Prior Publication Data
US 2023/0267057 A1 Aug. 24, 2023

(30) Foreign Application Priority Data
Aug. 21, 2020 (CN) .......................... 202010852383.0

(51) Int. Cl.
*G06F 11/30* (2006.01)
(52) U.S. Cl.
CPC ...... *G06F 11/3051* (2013.01); *G06F 11/3024* (2013.01)

(58) Field of Classification Search
CPC .................................................. G06F 11/3051
(Continued)

(56) References Cited

U.S. PATENT DOCUMENTS

| 6,625,729 B1 * | 9/2003 | Angelo | ............... | G06F 12/1433 |
| | | | | 711/E12.1 |
| 6,665,731 B1 * | 12/2003 | Kumar | ............... | H04L 41/0273 |
| | | | | 709/246 |

(Continued)

FOREIGN PATENT DOCUMENTS

| CN | 105183571 A | 12/2015 |
| CN | 109960661 A | 7/2019 |

(Continued)

OTHER PUBLICATIONS

PCT/CN2021/103285 international search report.

*Primary Examiner* — Titus Wong
(74) *Attorney, Agent, or Firm* — IPro, PLLC

(57) ABSTRACT

Disclosed is an IPMI command processing method for a BMC. The method includes the following steps: in response to receiving an IPMI command, determining character strings of several processing objects corresponding to the IPMI command; according to the character strings of the several processing objects, determining the several processing objects which are pre-registered with a hash table on a first process; and processing the IPMI command by using the several processing objects. Further disclosed are a system, a computer device and a readable storage medium. In the solution provided in the present disclosure, a first process is created in a BMC system, and data sharing and message communication between daemon processes of services are performed by means of the first process, such that the robustness of an IPMI function is significantly improved, which is more conducive to bug positioning, post-maintenance, etc.

6 Claims, 5 Drawing Sheets

(58) Field of Classification Search
USPC .......................................................... 710/15
See application file for complete search history.

(56) References Cited

U.S. PATENT DOCUMENTS

| | | | | |
|---|---|---|---|---|
| 8,677,452 | B2* | 3/2014 | Inbaraj | H04L 12/4625 |
| | | | | 726/2 |
| 8,898,349 | B1 | 11/2014 | Mondal et al. | |
| 9,141,464 | B2* | 9/2015 | Lin | G06F 11/0793 |
| 10,409,584 | B1* | 9/2019 | Kulchytskyy | G06F 8/65 |
| 10,860,308 | B1* | 12/2020 | Kulchytskyy | G06F 21/572 |
| 2008/0060068 | A1* | 3/2008 | Mabayoje | G06F 21/31 |
| | | | | 726/9 |
| 2009/0089624 | A1* | 4/2009 | Austen | G06F 11/0706 |
| | | | | 714/39 |
| 2014/0032641 | A1* | 1/2014 | Du | G06F 9/455 |
| | | | | 709/203 |
| 2016/0014073 | A1* | 1/2016 | Reddy | H04L 41/40 |
| | | | | 713/2 |
| 2016/0321197 | A1* | 11/2016 | Bhatia | G06F 13/124 |
| 2017/0085383 | A1* | 3/2017 | Rao | G06F 21/575 |
| 2017/0109531 | A1* | 4/2017 | Wang | G06F 21/575 |
| 2017/0116103 | A1* | 4/2017 | Cencini | H04L 41/24 |
| 2018/0165455 | A1* | 6/2018 | Liguori | G06F 21/57 |
| 2020/0133712 | A1* | 4/2020 | Rathineswaran | G06F 9/44521 |
| 2020/0257518 | A1* | 8/2020 | Liedtke | G06F 8/65 |

FOREIGN PATENT DOCUMENTS

| | | | |
|---|---|---|---|
| CN | 110633146 | A | 12/2019 |
| CN | 111984561 | A | 11/2020 |

\* cited by examiner

```
Class IpmiBase
{
   public:
      virtual ipmiLanset() = 0;
      virtual ipmiLanget() = 0;
      virtual ipmiReadFru() = 0;
      virtual ipmiWriteFru() = 0;
      virtual ipmiSetUserName() = 0;
      virtual ipmiSetUserPassword() = 0;
      virtual ipmiSetUserprivilege() = 0;
      ............
}
```

```
Class NetworkManagerBase
{
   public:
      virtual setLanInfo() = 0;
      virtual getLanInfo() = 0;
      ............
}
```

```
Class IpmiManager: virtual public IpmiBase
{
   public:
      ipmiLanset() { ······ }
      ipmiLanget() { ······ }
      ipmiReadFru() { ······ }
      ipmiWriteFru() { ······ }
      ············
}
```

FIG. 5

```
IpmiManager ipmiManagerServer;

vbus_register( "ipmi" , ipmiManagerServer );
```

FIG. 6

```
Class NetworkManager: virtual public NetworkManagerBase
{
   public:
      setLanInfo () { ······ }
      getLanInfo() { ······ }
      ············
}
```

FIG. 7

```
NetworkManager networkManagerServer;

vbus_register( "network_manager" , networkManagerServer );
```

FIG. 8

```
ipmiManager::ipmiLanset()
{
    ......
    NetworkManager networkManagerServer = vbus_getObject( "network_manager" );
    networkManagerServer.setLanInfo();
    ... ...
}
```

IPMI COMMAND PROCESSING METHOD AND SYSTEM FOR BMC, AND DEVICE AND MEDIUM

CROSS-REFERENCE TO RELATED APPLICATION

The present disclosure claims the priority of the Chinese patent application filed on Aug. 21, 2020 before the CNIPA, China National Intellectual Property Administration with the application number of 202010852383.0 and the title of "IPMI COMMAND PROCESSING METHOD AND SYSTEM FOR BMC, AND DEVICE AND MEDIUM", which is incorporated herein in its entirety by reference.

FIELD

The present disclosure relates to the field of BMCs and, more particularly, to an IPMI command processing method and system for a BMC, a device, and a storage medium.

BACKGROUND

At present, relatively mature Baseboard Management Controller (BMC) systems in the market have included the implementation of an Intelligent Platform Management Interface (IPMI) protocol. The most common way is that: after the BMC system is started, an ipmid daemon is started to monitor and manage each index of a Central Processing Unit (CPU) side in real time; some other management work, such as user management and network configuration is completed; and IPMI requests from different channels, such as in-band requests from the CPU side or out-of-band requests from a network side are processed.

Such an embodiment of all contents of the IPMI protocol via a large and complete daemon simplifies a software structure to a certain extent, however, due to the numerous contents, once problems occur in any link, the whole IPMI function may be abnormal, and therefore, it is essential to rigorously handle various abnormalities. It is not friendly to both of the robustness and maintainability of software.

SUMMARY

In view of this, in order to overcome at least one aspect of the above-mentioned problems, an embodiment of the present disclosure provides an IPMI command processing method for a BMC, including the following steps:
in response to receiving an IPMI command, determining character strings of a plurality of processing objects corresponding to the IPMI command;
determining, according to the character strings of the plurality of processing objects, the plurality of processing objects pre-registered in a Hash table in a first process; and
processing the IPMI command by using the plurality of processing objects.

In some embodiments, determining, according to the character strings of the plurality of processing objects, the plurality of processing objects pre-registered in the Hash table in the first process further includes:
in response to starting the BMC, starting the first process, an ipmid master process and a plurality of management processes; and
invoking a first functional function in the first process by using the ipmid master process to register a plurality of command processing objects created in the ipmid master process in the Hash table, and invoking the first functional function in the first process by using the plurality of management processes to register a plurality of management processing objects created in the plurality of management processes in the Hash table.

In some embodiments, the method further includes:
invoking the command processing objects and/or the management processing objects in the Hash table by using a second functional function in the first process according to the character strings.

In some embodiments, invoking the command processing objects and/or the management processing objects in the Hash table by using the second functional function in the first process according to the character strings further includes:
determining, by using the command processing objects, whether the IPMI command complies with a preset rule; and
in response to complying with the preset rule, invoking, by the command processing objects, the corresponding management processing objects to perform processing by using processing methods preset in the management processing objects.

In some embodiments, in response to receiving the IPMI command, determining character strings of the plurality of processing objects corresponding to the IPMI command further includes:
in response to receiving an in-band IPMI command, parsing the in-band IPMI command by using an in-band processing process to determine corresponding character strings.

In some embodiments, in response to receiving the IPMI command, determining character strings of the plurality of processing objects corresponding to the IPMI command further includes:
in response to receiving an out-of-band IPMI command, parsing the out-of-band IPMI command by using an out-of-band processing process to determine corresponding character strings.

In some embodiments, invoking the first functional function in the first process by using the ipmid master process to register the plurality of command processing objects created in the ipmid master process in the Hash table, and invoking the first functional function in the first process by respectively using the plurality of management processes to register the plurality of management processing objects created in the plurality of management processes in the Hash table further includes:
defining a plurality of virtual base classes in the Hash table in the first process, and inheriting corresponding virtual base classes by using core classes in the ipmid master process and the plurality of management processes; and
creating the corresponding command processing objects or the management processing objects by using the core classes that inherit the virtual base classes.

Based on the same inventive concept, according to another aspect of the present disclosure, an embodiment of the present disclosure further provides an IPMI command processing system for a BMC, including:
a first determination module, the first determination module being configured to, in response to receiving an IPMI command, determine character strings of a plurality of processing objects corresponding to the IPMI command;
a second determination module, the second determination module being configured to determine, according to the character strings of the plurality of processing objects, the plurality of processing objects pre-registered in a Hash table in a first process; and a processing module, the processing module being configured to process the IPMI command by using the plurality of processing objects.

Based on the same inventive concept, according to another aspect of the present disclosure, an embodiment of the present disclosure further provides a computer device, including:

at least one processor; and a memory, the memory storing a computer program capable of running on the processor, wherein the processor, when executing the program, performs the steps of any IPMI command processing method for the BMC as described above.

Based on the same inventive concept, according to yet another aspect of the present disclosure, an embodiment of the present disclosure further provides a computer-readable storage medium storing a computer program, and the computer program, when executed by a processor, performing the steps of any IPMI command processing method for the BMC as described above.

The present disclosure has one of the following beneficial technical effects: according to a solution provided by the present disclosure, by creating a "virtual bus" (the first process) in the BMC system and splitting a complete ipmid service into a plurality of different management service functions to be "hooked" into this bus, data sharing and message communication are achieved among daemons of all services via the "virtual bus" (the first process). The robustness of an IPMI function is significantly improved, and the present disclosure is more conducive to bug location, post-maintenance, etc.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

FIG. 5 is a schematic diagram of a core class IpmiManager implemented in an ipmid process;

FIG. 6 is a schematic diagram of an object ipmiManagerServer created in an ipmid process on the basis of a core class IpmiManager;

FIG. 7 is a schematic diagram of a core class NetworkManger implemented in a network management module process;

FIG. 8 is a schematic diagram of an object NetworkMangerServer created in a network management module process on the basis of a core class NetworkManger;

DETAILED DESCRIPTION

For clearer descriptions of the objectives, technical solutions, and advantages of the present disclosure, embodiments of the present disclosure are described hereinafter in detail with reference to embodiments and the accompanying drawings.

It should be noted that all expressions using "first" and "second" in the embodiments of the present disclosure are intended to distinguish two different entities or parameters with the same name. It may be seen that "first" and "second" are merely for the convenience of expressions and should not be construed as limiting the embodiments of the present disclosure, which will not be stated one by one in subsequent embodiments.

Figure 1:
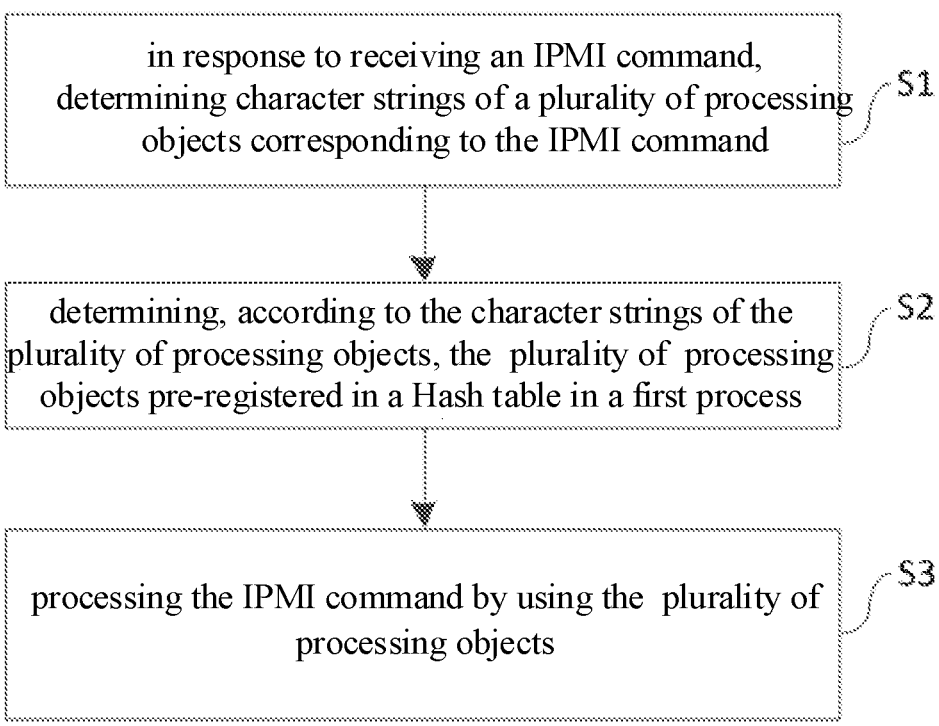
FIG. 1 is a schematic flow chart of an IPMI command processing method for a BMC provided in an embodiment of the present disclosure.

According to one aspect of the present disclosure, an embodiment of the present disclosure provides an IPMI command processing method for a BMC, as shown in FIG. 1, which may include the steps:

S1, in response to receiving an IPMI command, character strings of a plurality of processing objects corresponding to the IPMI command are determined;

S2, the plurality of processing objects pre-registered in a Hash table in a first process are determined according to the character strings of the plurality of processing objects; and S3, the IPMI command is processed by using the plurality of processing objects.

The plurality of processing objects correspond to a plurality of management service functions in a complete ipmid service.

According to a solution provided by the present disclosure, by creating a "virtual bus" (the first process) in a BMC system and splitting a complete ipmid service into a plurality of different management service functions to be "hooked" into this bus, data sharing and message communication are achieved among daemons of all services via the "virtual bus" (the first process). The robustness of an IPMI function is significantly improved, and the present disclosure is more conducive to bug location, post-maintenance, etc.

In some embodiments, step S1 that in response to receiving the IPMI command, the plurality of character strings of processing objects corresponding to the IPMI command are determined further includes:

in response to receiving an in-band IPMI command, the in-band IPMI command is parsed by using an in-band processing process to determine corresponding character strings.

In some embodiments, step S1 that in response to receiving the IPMI command, the plurality of character strings of processing objects corresponding to the IPMI command are determined further includes:

in response to receiving an out-of-band IPMI command, the out-of-band IPMI command is parsed by using an out-of-band processing process to determine corresponding character strings.

Figures 2, 3, 4:
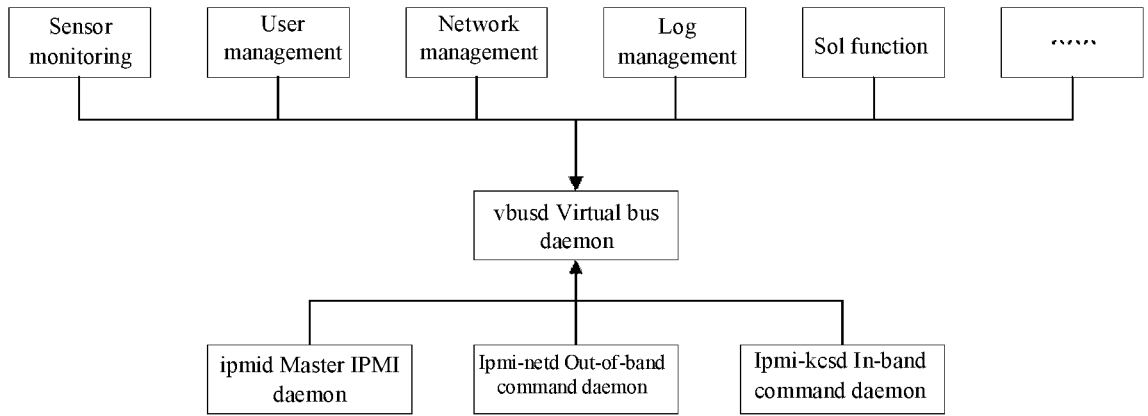
FIG. 2 is an architectural diagram of an IPMI command processing method provided in an embodiment of the present disclosure.
FIG. 3 is a schematic diagram of a virtual base class that defines an ipmid process in a vbusd.
FIG. 4 is a schematic diagram of a virtual base class that defines a network management module in a vbusd.

In some embodiments of the present disclosure, as shown in FIG. 2, the IPMI command may be monitored and forwarded by the out-of-band processing process (ipmi-netd) and the in-band processing process (ipmi-kcsd). The ipmi-netd daemon is mainly responsible for monitoring and forwarding out-of-band IPMI command requests and implementing Serial Over LAN (SOL)-related commands. According to an IPMI protocol, the ipmi-netd may monitor a socket port 623. For example, when a user initiates a user addition command out of band, the ipmi-netd monitors the input of the command, performs a series of operations for creating a session firstly, then parses the content of the command, sends the same to a vbusd (the first process), finds objects registered in corresponding ipmid processes and objects registered in corresponding management processes to perform processing by using functions in the objects, and finally returns a command result to the user via the ipmi-netd; when a user initiates a sol request, the ipmi-netd directly parses the content of the command and then sends the same to the vbusd to find the processing objects that have been registered by the sol module (the management processes) to perform processing. The ipmi-kcsd daemon is mainly responsible for monitoring and forwarding in-band IPMI command requests (herein, it is assumed that in-band access is implemented via a Kernel Cache System (KCS) channel, and in-band access performed via other channels is based on the same principle and is slightly different in implementation details). For example, when a user initiates an in-band user addition request from a CPU end system, data of a message of the request may be sent to the BMC via the KCS channel, and a bottom-layer KCS driver for the BMC receives the message and throws the same to an upper-layer ipmi-kcsd thread. After receiving the message, the ipim-kcsd parses the content of the command, forwards the same to the vbusd, finds the objects registered in the corresponding ipmid processes to perform processing by using the functions in the objects, and finally returns the command result to the user via the ipmi-kcsd.

In some embodiments, step S2 that the plurality of processing objects pre-registered in the Hash table in the first process are determined according to the character strings of the plurality of processing objects further includes:

S21, in response to starting the BMC, the first process, an ipmid master process and a plurality of management processes are started; and S22, a first functional function in the first process is invoked by using the ipmid master process to register a plurality of command processing objects created in the ipmid master process in the Hash table, and the first functional function in the first process is invoked by using the plurality of management processes to register a plurality of management processing objects created in the plurality of management processes in the Hash table.

In some embodiments, the method further includes:

S23, the command processing objects and/or the management processing objects in the Hash table are invoked by using a second functional function in the first process according to the character strings.

In some embodiments, S23 of the command processing objects and/or the management processing objects in the Hash table are invoked by using the second functional function in the first process according to the character strings further includes:

determining, by using the command processing objects, whether the IPMI command complies with a preset rule; and in response to complying with the preset rule, the command processing objects invok the corresponding management processing objects to perform processing by using processing methods preset in the management processing objects.

In some embodiments, step S22 that a first functional function in the first process is invoked by using the ipmid master process to register the plurality of command processing objects created in the ipmid master process in the Hash table, and the first functional function in the first process is invoked by respectively using the plurality of management processes to register the plurality of management processing objects created in the plurality of management processes in the Hash table further includes:

a plurality of virtual base classes are defined in the Hash table in the first process, and corresponding virtual base classes are inherited by using core classes in the ipmid master process and the plurality of management processes; and the corresponding command processing objects or the management processing objects are created by using the core classes that inherit the virtual base classes.

In some embodiments of the present disclosure, the role of the vbusd daemon (the first process) is to create and maintain a "software bus", i.e. the vbusd, in a memory. The vbusd is a well-designed data structure similar to the Hash table. As a bus, it is required to design some protocol provisions to facilitate the interaction among the different processes. The main functions are described as follows:

(1) after a vbusd process is started, an empty Hash table vbusHashMap is created. As the most core data structure of the vbusd process, this structure may be understood as that the vbusHashMap is used as the "core bus" in this solution, and the objects in other processes may be "mounted" in this structure.

(2) Some virtual base classes are designed and implemented as general standards. When designing its core class, each functional module has to inherit the corresponding virtual base class in the vbusd and implement a virtual function defined therein. For example, as shown in FIG. 3, a virtual base class (IpmiBase) of an ipmid process is defined in the vbusd, and a plurality of virtual functions are defined in the virtual base class IpmiBase, and these virtual functions represent command processing functions of various ipmi commands. For another example, as shown in FIG. 4, a virtual base class (NetworkManagerBase) of a network management module is defined in the vbusd, and a plurality of virtual functions are defined in the virtual base class NetworkManagerBase. There is no need to provide implementation details for the virtual functions, and the implementation of these functions is the implementation of the core function in the ipmid process. For example, it may be known from FIG. 3 and FIG. 4 that ipmid needs to implement two functions of network configuration: ipmiLanSet ( ) and ipmiLanGet ( ) These two functions may be finally invoked to setLanInfo ( ) and getLanInfo ( ) of a network configuration module via the vbusd. The core class implemented by the network configuration module may inherit the NetworkManagerBase virtual base class and implements function details therein.

(3) Two core functional functions of the vbusd are defined:

vbus_register (a first functional function) responsible for registering an object of a core class implemented in each management service functional module into a vbusHashMap structure; and vbus_getObject (a second functional function) responsible for finding a target object from the vbusHashMap and performing corresponding processing.

(4) In order to invoke the virtual base classes and the two core functions defined in the vbusd in the process of each functional module, these virtual base classes and the two core functions are compiled into a dynamic link library vbus_public.so at a compilation stage of the vbusd. Other management service functional modules introduce the vbus_public.so as a compilation parameter during compilation, in this way, these functional modules may invoke the virtual functions as well as the vbus_register and the vbus_getObject by introducing corresponding header files when writing codes.

In some embodiments, as shown in FIG. 5, a core class IpmiManager is implemented in the ipmid process, and this class inherits the base class IpmiBase as shown in FIG. 3 and implements all command processing functions defined in the base class. Thus, the ipmid process implements the inheritance of the core class IpmiManager from the IpmiBase. Then, as shown in FIG. 6, an ipmiManagerServer object is created on the basis of the core class IpmiManager, and the function vbus_register ( ) is invoked to be registered in the vbusd. A first parameter of the function vbus_register ( ) is a character string, which is used as a key value of each element in the Hash table vbusHashMap, and the subsequent functions vbus_getObject finds the corresponding objects via this key value.

It should be noted that character strings of the command processing objects and/or the management processing objects corresponding to each IPMI command may be preset, in this way, after the IPMI command is received, the corresponding command processing objects and/or management processing objects may be invoked. Herein, a command processing function implemented in the IpmiManager is mainly responsible for performing operations such as parsing and filtering on the ipmi command (i.e. determining whether the IPMI command complies with a preset rule, for example, determining whether the length of a user name complies with requirements, etc.), and for real management operations, processing methods in the objects registered by the corresponding management service functional modules in the Hash table are further needed to be invoked.

In some embodiments, as shown in FIG. 2, bottom-layer management service functional modules implemented by the various ipmi protocols are split into individual software services that may include user management, network configuration management, log management, sol, etc. Similar to the ipmid process, in each management service process, a management class object complying with the vbusd rule may be created on the basis of the core class inherited from the virtual base class in the vbusd, and these objects include various methods for implementing an ipmi function, and finally, these objects are registered in the vbusd by invoking the first functional function of the vbusd, thereby facilitating invoking the command processing functions in the command processing objects of the ipmid.

Taking the network management module as an example, classes to be implemented are shown in FIG. 7. The network management module implements the core class NetworkManger inheriting from the virtual base class NetworkManagerBase in the vbusd, and implements two key methods. Then, the object NetworkMangerServer shown in FIG. 8 is created and registered in the vbusd via the vbus_register ( ) In this way, as shown in FIG. 9, the command processing functions in the command processing objects in the ipmid may find the management processing objects in the corresponding management service functional modules in the vbusHashMap via the character strings.

According to a solution provided by the present disclosure, by creating a "virtual bus" (the first process) in a BMC system and splitting a complete ipmid service into a plurality of different management service functions to be "hooked" into this bus, data sharing and message communication are achieved among daemons of all services via the "virtual bus" (the first process). The robustness of an IPMI function is significantly improved, and the present disclosure is more conducive to bug location, post-maintenance, etc.

Figures 9, 10:
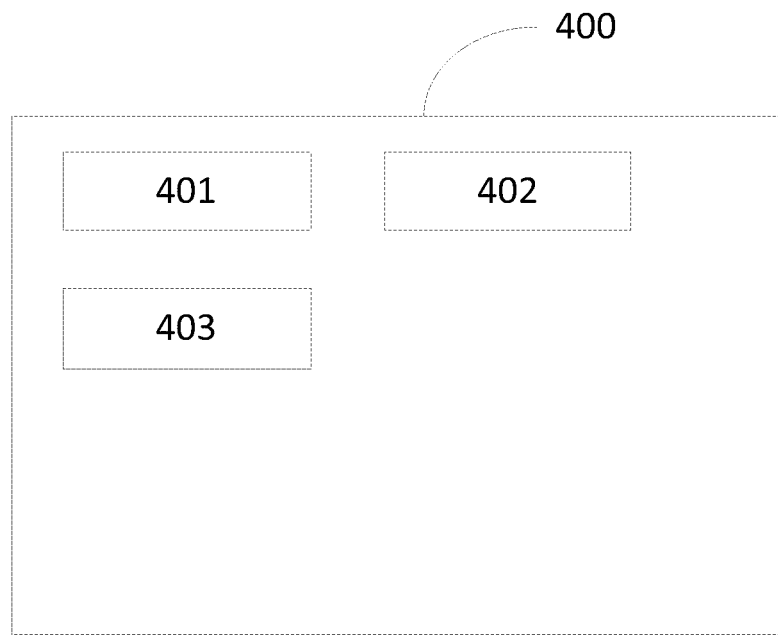
FIG. 9 is a schematic diagram for determining processing objects by using a second functional function according to character strings.
FIG. 10 is a schematic structural diagram of an IPMI command processing system provided in an embodiment of the present disclosure.

Based on the same inventive concept, according to another aspect of the present disclosure, an embodiment of the present disclosure further provides an IPMI command processing system 400 for a BMC, as shown in FIG. 10, including:

a first determination module 401, the first determination module 401 being configured to, in response to receiving an IPMI command, determine character strings of a plurality of processing objects corresponding to the IPMI command;

a second determination module 402, the second determination module 402 being configured to determine, according to the character strings of the plurality of processing objects, the plurality of processing objects pre-registered in a Hash table in a first process; and a processing module 403, the processing module 403 being configured to process the IPMI command by using the plurality of processing objects.

Figure 11:
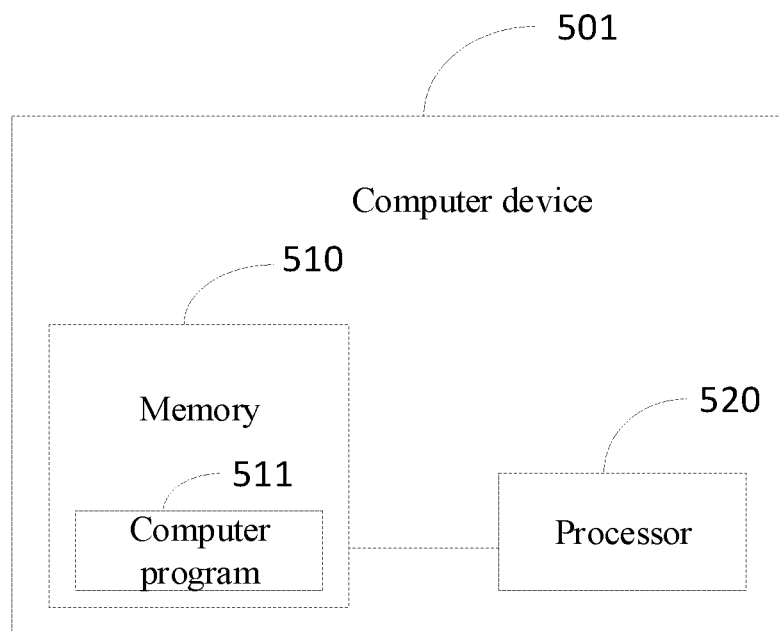
FIG. 11 is a schematic structural diagram of a computer device provided in an embodiment of the present disclosure.

Based on the same inventive concept, according to another aspect of the present disclosure, as shown in FIG. 11, an embodiment of the present disclosure further provides a computer device 501 including:

at least one processor 520; and a memory 510, the memory 510 storing a computer program 511 capable of running on a processor, and the processor 520, when executing the program, performing the steps of any IPMI command processing method for the BMC as described above.

Figure 12:
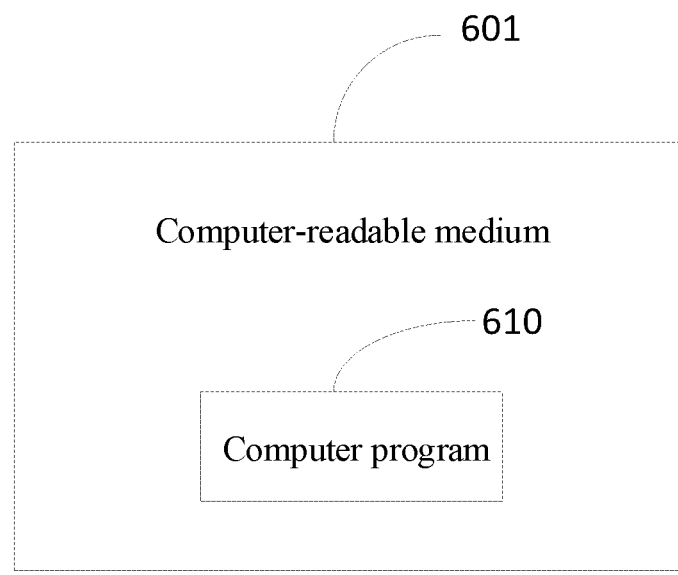
FIG. 12 is a schematic structural diagram of a computer-readable storage medium provided in an embodiment of the present disclosure.

Based on the same inventive concept, according to yet another aspect of the present disclosure, as shown in FIG. 12, an embodiment of the present disclosure further provides a computer-readable storage medium 601, the computer-readable storage medium 601 storing a computer program instruction 610, and the computer program instruction 610, when executed by a processor, performing the steps of any IPMI command processing method for the BMC as described above.

Finally, it should be noted that those of ordinary skill in the art would understand that all or part of the processes for implementing the methods in the above-mentioned embodiments may be implemented by a computer program which instructs relevant hardware, and the program for the IPMI command processing method for the BMC may be stored in a computer-readable storage medium, and when executed, the program may include the processes in the embodiments of the methods as described above.

Further, it should be understood that the computer-readable storage medium (e.g. a memory) described herein may be either a volatile memory or a nonvolatile memory, or may include both of the volatile memory and the nonvolatile memory.

Those skilled in the art would further understand that various illustrative logical blocks, modules, circuits and algorithm steps described in connection with the disclosure described herein may be implemented as electronic hardware, computer software, or a combination of both. To clearly illustrate this interchangeability of hardware and software, various illustrative assemblies, blocks, modules, circuits and steps have been described generally in terms of their functionality. Whether such functionality is implemented as software or hardware depends upon particular applications and design constraints imposed on the overall system. The skilled in the art may implement the functionality for each particular application in various ways, but the decision of such implementation should not be interpreted as causing a departure from the scope disclosed in the embodiments of the present disclosure.

The above are exemplary embodiments of the present disclosure, but it shall be noted that various changes and modifications may be made without deviating from the scope of the embodiments of the present disclosure as defined by the appended claims. The functions, steps, and/or actions of the method claims according to the disclosed embodiments described herein need not be performed in any particular order. Furthermore, although elements according to the embodiments of the present disclosure may be described or claimed in the singular, the plural is contemplated unless limitation to the singular is explicitly stated.

It should be understood that, as used herein, the singular forms "a", "an", and "the" are intended to include the plural forms as well, unless the context clearly supports the exception. It should also be understood that the term "and/or" as used herein refers to any or all possible combinations including one or more associated listed items.

The number of the embodiment of the present disclosure is only for description, which does not represent the advantages and disadvantages of the embodiment.

It may be appreciated by persons of ordinary skill in the art that all or part of the steps for implementing the above embodiments may be completed by hardware, or may be completed by instructing relevant hardware through a program. The program may be stored in a computer-readable storage medium, which may be a read-only memory, a magnetic disk or a compact disk, etc.

Those of ordinary skill in the art will appreciate that the above discussion of any embodiment is intended to be exemplary merely, and is not intended to suggest that the scope (including the claims) of the embodiments of the present disclosure is limited to these examples; and combinations of features in the above embodiments or in different embodiments are also possible within the framework of the embodiments of the present disclosure, and many other variations of different aspects according to the embodiments of the present disclosure as described above are possible, which are not provided in detail for the sake of clarity. Therefore, any omission, modification, equivalent substitution, improvement, etc. made within the spirit and principles of the embodiments of the present disclosure shall fall within the scope of the embodiments of the present disclosure.

The invention claimed is:

1. A computer device, comprising:
   at least one processor; and
   a memory, the memory storing a computer program that is executed by the at least one processor, and upon execution by the at least one processor, is configured to cause the at least one processor to:
   in response to receiving an intelligent platform management interface command, determine character strings of a plurality of processing objects corresponding to the intelligent platform management interface command;
   determine, according to the character strings of the plurality of processing objects, the plurality of processing objects pre-registered in a Hash table in a first process; and
   process the intelligent platform management interface (IPMI) command by using functions of the plurality of processing objects-;
   wherein the operation of determining, according to the character strings of the plurality of processing objects, the plurality of processing objects pre-registered in the Hash table in the first process further comprises:
   in response to starting the baseboard management controller, starting the first process, an ipmid master process and a plurality of management processes, wherein the ipmid master process is a process responsible for parsing and distributing an IPMI protocol; and
   invoking a first functional functionv in the first process by using the ipmid master process to register a plurality of command processing objects created in the ipmid master process in the Hash table, and invoking the first functional function in the first process by using the plurality of management processes to register a plurality of management processing objects created in the plurality of management processes in the Hash table.

2. A non-transitory computer readable storage medium storing computer program that, when executed by a processor, cause the processor to:
   in response to receiving an intelligent platform management interface command, determine character strings of a plurality of processing objects corresponding to the intelligent platform management interface command;
   determine, according to the character strings of the plurality of processing objects, the plurality of processing objects pre-registered in a Hash table in a first process; and
   process the intelligent platform management interface (IPMI) command by using functions of the plurality of processing objects-;
   wherein the operation of determining, according to the character strings of the plurality of processing objects, the plurality of processing objects pre-registered in the Hash table in the first process further comprises:
   in response to starting the baseboard management controller, starting the first process, an ipmid master process and a plurality of management processes; and
   invoking a first functional function in the first process by using the ipmid master process to register a plurality of command processing objects created in the ipmid master process in the Hash table, and invoking the first functional function in the first process by using the plurality of management processes to register a plurality of management processing objects created in the plurality of management processes in the Hash table.

3. The computer device according to claim 1, further comprising:
   invoking the command processing objects and/or the management processing objects in the Hash table by using a second functional function in the first process according to the character strings.

4. The computer device according to claim 3, wherein the operation of invoking the command processing objects and/or the management processing objects in the Hash table by using the second functional function in the first process according to the character strings further comprises:
- determining, by using the command processing objects, whether the intelligent platform management interface command complies with a preset rule; and
- in response to complying with the preset rule, invoking, by the command processing objects, the corresponding management processing objects to perform processing by using processing methods preset in the management processing objects.

5. The computer device according to claim 1, wherein the operation of in response to receiving the intelligent platform management interface command, determining character strings of the plurality of processing objects corresponding to the intelligent platform management interface command further comprises:
- in response to receiving an in-band intelligent platform management interface command, parsing the in-band intelligent platform management interface command by using an in-band processing process to determine corresponding character strings.

6. The computer device according to claim 1, wherein the operation of in response to receiving the intelligent platform management interface command, determining character strings of the plurality of processing objects corresponding to the intelligent platform management interface command further comprises:
- in response to receiving an out-of-band intelligent platform management interface command, parsing the out-of-band intelligent platform management interface command by using an out-of-band processing process to determine corresponding character strings.

* * * * *